P. BOTTGER.
Saddle Tree.
No. 239,709.  Patented April 5, 1881.
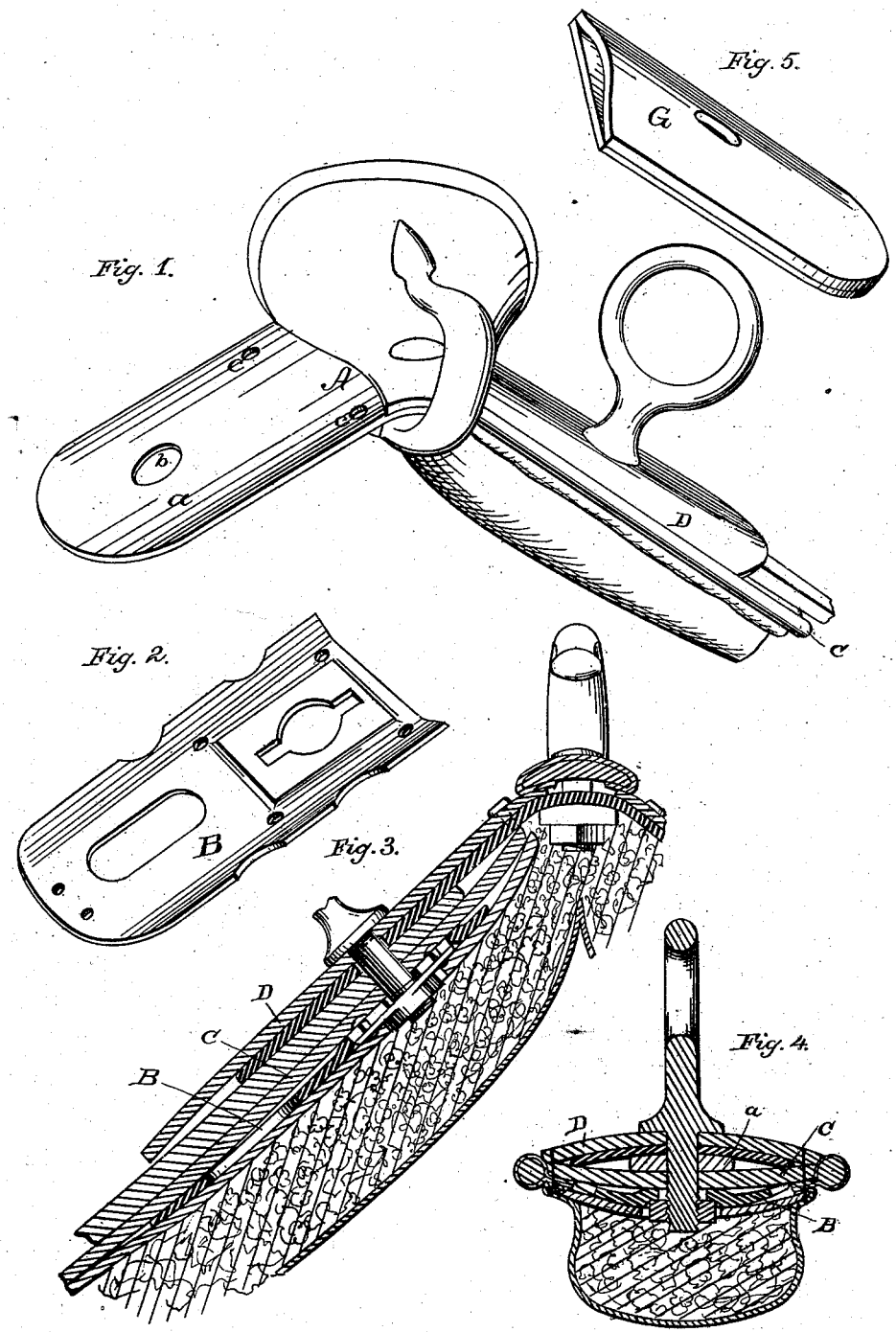

UNITED STATES PATENT OFFICE.

POLITORUS BOTTGER, OF NEWARK, NEW JERSEY, ASSIGNOR TO EDWIN R. CAHOONE, OF SAME PLACE.

SADDLE-TREE.

SPECIFICATION forming part of Letters Patent No. 239,709, dated April 5, 1881.

Application filed April 1, 1876.

*To all whom it may concern:*

Be it known that I, POLITORUS BOTTGER, of Newark, Essex county, New Jersey, have invented an Improvement in Saddle-Trees, of which the following is a full and exact description.

This invention relates to the construction of a saddle-tree to secure the following results: first, a transversely-convex surface of the jockey, by constructing the tree with a transversely-convex surface, to which the jockey conforms; second, a back-band space below the tree by the employment of a lower plate having a concave upper surface; third, a jockey-flap and pad constructed separate from the tree and removable therefrom; and to this end it consists, first, in a saddle-tree transversely convex on its upper surface, so as to impart a corresponding shape to a leather jockey; second, in a lower plate transversely concave on its upper side, to be applied to the lower side of the flap-leather to hold the terret-nut and make a space for the back-band; third, in a flap and jockey made separate from the tree and constructed with a pocket capable of receiving the end of the tree, and removable therefrom, as hereinafter set forth, whereby the saddle and jockey flaps may be separately manufactured and packed for transportation.

That others may fully understand my invention, I will particularly describe it, having reference to the accompanying figures, wherein—

Figure 1 is a perspective view of my saddle with one arm of the tree naked. Fig. 2 is a perspective view of the concave lower plate. Fig. 3 is a longitudinal section of the complete saddle. Fig. 4 is a transverse section through the terret. Fig. 5 is a perspective view of arm-pocket detached.

A is the body of the tree. The arms *a* are transversely convex, as shown, and provided with terret-holes *b* and holes *c c* near the upper part, through which tuft-nails are driven to secure the jockey and flap when the saddle is put together. A concave plate, B, is rigidly secured to the under side of the flap C, which is then lined and padded over said plate, to which the terret-nut has first been secured. The jockey D is then placed upon the flap C and sewed thereto along its edges, leaving it unattached at its ends, so as to form a pocket to receive the end of the tree-arm *a* between said jockey and flap. The jockey and flap are then ready for attachment to the tree, and may be attached at once or packed for transportation separately.

It may be preferred sometimes or for some purposes to form a pocket by simply lining the jockey, which is not then secured to the flap at all, except by the terret-bolts and tuft-nails. This pocket is shown at G, Fig. 5. It will be observed that in saddles constructed before this invention the jockey covers and secures the back-band and flap, whereas with my invention it forms only a cover for the tree, and has no part in securing the back-band.

When the saddle is put together the end of the tree-arm *a* is slipped into the pocket prepared for it under the jockey D, and the terret-bolt is passed through a hole in the jockey and tree provided for it, and through the back-band flap, and into the terret-nut, whereby the jockey, tree, back-band, and flap are secured together.

I am aware that iron jockey-trees have been made before my invention; but they were not made for nor used with a leather jockey, nor were they convex on the upper side, but simply iron jockey-trees, the frame itself forming the jockey. My invention is materially different from these, inasmuch as it combines the beauty of the leather jockey with the cheapness of the iron jockey.

Having described my invention, what I claim as new is—

1. The frame A, with a transversely-convex surface, substantially as described.

2. The convex frame A, in combination with the pocket and leather jockey, said pocket being formed by lining the jockey, as at G, or by securing the edges of the same to the flap D, substantially as described.

3. The concave under plate secured to the under side of the flaps, combined with a frame, A, substantially as described, for the purpose of forming a space to receive the back-band, substantially as described.

4. The separate concave plates B, secured to the under sides of the flaps D, combined with the frame A, substantially as set forth, so that said flaps may be readily attached to or detached from said tree for the purpose of convenience of separate manufacture or transportation.

5. The combination of a frame, A, transversely convex, and under plate or plates, B, also transversely convex, arranged with their concave sides respectively inward, so as to form a cavity between them for the reception of the back-band, as set forth.

In testimony that I claim the above improvements in harness-saddles I have hereunto set my hand this 30th day of March, 1876.

POLITORUS BOTTGER.

Witnesses:
  J. WHITEHEAD,
  E. R. CAHOONE.